United States Patent
Kim

(10) Patent No.: US 12,060,125 B2
(45) Date of Patent: Aug. 13, 2024

(54) APPARATUS FOR AND METHOD OF CONTROLLING STEER-BY-WIRE STEERING SYSTEM

(71) Applicant: HYUNDAI MOBIS CO., LTD., Seoul (KR)

(72) Inventor: Lyoung Tae Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 279 days.

(21) Appl. No.: 17/811,137

(22) Filed: Jul. 7, 2022

(65) Prior Publication Data
US 2023/0019056 A1 Jan. 19, 2023

(30) Foreign Application Priority Data
Jul. 13, 2021 (KR) .................. 10-2021-0091382

(51) Int. Cl.
  *B62D 6/00* (2006.01)
  *B62D 5/04* (2006.01)
  *B62D 6/08* (2006.01)
  *B62D 15/02* (2006.01)

(52) U.S. Cl.
  CPC .......... *B62D 6/002* (2013.01); *B62D 5/0481* (2013.01); *B62D 6/08* (2013.01); *B62D 15/0285* (2013.01)

(58) Field of Classification Search
  CPC ........ B62D 6/002; B62D 5/0481; B62D 6/08; B62D 15/0285; B62D 15/021; B62D 15/0215; B62D 15/022; B62D 15/0225; B62D 15/023; B62D 15/0235
  See application file for complete search history.

(56) References Cited

U.S. PATENT DOCUMENTS

2007/0288145 A1* 12/2007 Maeda ............... B62D 15/0285
  701/41
2021/0061344 A1* 3/2021 Kitazume ............. B62D 1/286

FOREIGN PATENT DOCUMENTS

KR 2018-0065045 6/2018

OTHER PUBLICATIONS

English Language Abstract of KR 2018-0065045 published Jun. 18, 2018.

* cited by examiner

*Primary Examiner* — Jacob M Amick
(74) *Attorney, Agent, or Firm* — DLA Piper LLP US

(57) ABSTRACT

Proposed is an apparatus for controlling a steer-by-wire steering system, the apparatus comprising: a steering angle sensor configured to detect a steering angle position; a steering position control command receiver configured to receive a steering position control command y2 from a designated external module; a processor configured to generate a steering angle position signal y1 based on the steering angle position from the steering angle sensor, compute a compensation gain x corresponding to column torque or motor electric current of a steering force actuator (SFA) when a driver's involvement occurs, compute a final steering position control command Y by reflecting the compensation gain x to the steering angle position signal y1 and the steering position control command y2, and output the final steering position control command Y to the steering force actuator (SFA).

14 Claims, 3 Drawing Sheets

APPARATUS FOR AND METHOD OF CONTROLLING STEER-BY-WIRE STEERING SYSTEM

CROSS-REFERENCE TO RELATED APPLICATION

This application claims priority from and the benefit of Korean Patent Application No. 10-2021-0091382, filed on Jul. 13, 2021, which is hereby incorporated by reference for all purposes as if set forth herein.

BACKGROUND

Field

Exemplary embodiments of the present disclosure relate to an apparatus for and a method of controlling a steer-by-wire steering system and, more particularly, to an apparatus for and a method of controlling a steer-by-wire steering system, the apparatus and the method being capable of detecting a driver's involvement during steering angle position control for automatic parking and compensating the steering angle position control in a steer-by-wire (SBW) steering system in which a steering force actuator (SFA) and a Road Wheel Actuator (RWA) are not mechanically connected to each other. With the apparatus and the method, the driver's perceiving a feeling of being impacted and an occurrence of a collision from occurring can be prevented.

Discussion of the Background

Normally, power steering systems, as vehicle steering apparatuses (or steering systems), have been developed and mounted in vehicles in order to assist a driver in operating a steering wheel and thus to provide the driver with the convenience of operating the steering wheel for driving. These power steering systems include a hydraulic-type power steering system using hydraulic pressure, an electrohydraulic-type power steering system using hydraulic pressure and motor motive power at the same time, an electro-type power steering system using only motor motive power, and the like.

In recent years, steer-by-wire (SBW) type steering systems (or steer-by-wire steering systems) have been developed and mounted in the vehicles. In the SBW type steering systems, vehicle steering is performed using a motor such as an electric motor, instead of removing a mechanical connecting apparatus, such as a steering column, a universal joint, or a pinion shaft, between a steering wheel and a vehicle wheel (that is, a vehicle drive wheel).

The SBW steering system is a steering system in which a steering wheel and a front-wheel steering apparatus (that is, a rack to which a drive wheel is connected) are mechanically disconnected from each other. The SBW steering system receives a rotational signal of the steering wheel from an electronic control unit (ECU) over a communication line (for example, direct CAN) and operates a steering motor connected to the rack on the basis of the input rotational signal of the steering wheel, thereby steering a vehicle.

In recent years, parking assist (PA) systems have been mounted in the vehicles. The parking assist (PA) system is a system that transfers a position control signal (that is, a steering position control signal) to a steering system and thus controls a position (that is, a steering position) of a vehicle wheel, thereby assisting in automatically parking the vehicle.

In this case, in order for the parking assist (PA) system to operate normally, the steering system performs feedback control in such a manner as to follow a steering angle control command. During normal operation, the steering system performs reaction force control. However, when receiving a position control activation signal, the steering system transitions to a position control mode, thereby following a position command.

More specifically, as the position control (that is, the steering position control), feedback control that uses a difference between a position in compliance with a steering position control command and a current steering position is executed.

However, in the related art, there has been no method of determining a driver's involvement and compensating the driver's involvement while the parking assist (PA) system performs steering control.

Therefore, when the driver's involvement occurs during steering position control, the difference between the position in compliance with the steering position control command and the current steering position increases, and a great force occurs in order to compensate for the difference. Thus, due to a feeling of being impacted, the driver performs excessive steering. There is a problem in that there is a higher likelihood that the excessive steering will lead to a vehicle accident.

In the steer-by-wire steering system, a mechanical connection structure (that is, a connection of a steering wheel and a front-wheel steering apparatus) employed by a steering system in the related art is removed. In this situation, there is a need for a technology for precisely controlling a front-wheel steering apparatus (for example, a front-wheel wheel steering actuator) in a manner that corresponds to the steering position control command (that is, the rotational signal of the steering wheel) corresponding to operation of the steering wheel by the driver.

An example of the related art with respect to the present disclosure is disclosed in Korean Patent Application Publication No. 10-2018-0065045 (published on Jun. 18, 2018, titled "CONTROLLED METHOD FOR STEERING IN STEER-BY-WIRE SYSTEM").

SUMMARY

Various embodiments are directed to an apparatus for and a method of controlling a steer-by-wire steering system, the apparatus and the method being capable of detecting a driver's involvement during steering angle position control for automatic parking and compensating the steering angle position control in a steer-by-wire (SBW) steering system in which a steering force actuator (SFA) and a Road Wheel Actuator (RWA) are not mechanically connected to each other.

In an embodiment, an apparatus for controlling a steer-by-wire steering system may include: a steering angle sensor configured to detect a steering angle position; a steering position control command receiver configured to receive a steering position control command y2 from a designated external module; a processor configured to generate a steering angle position signal y1 based on the steering angle position from the steering angle sensor, compute a compensation gain x corresponding to column torque or motor electric current of a steering force actuator (SFA) when a driver's involvement occurs, compute a final steering position control command Y by reflecting the compensation gain x to the steering angle position signal y1 and the steering position control command y2, and output the final steering position control command Y to the steering force actuator (SFA).

In the apparatus, the designated external module may include a parking assist (PA) system.

In the apparatus, the compensation gain x may be a compensation gain x for compensating steering position control initiated by the driver's involvement in steering during automatic steering by the designated external module.

In the apparatus, the processor may compute the compensation gain x corresponding to the column torque or the motor electric current using a predetermined equation or look-up table.

In the apparatus, the processor may compute the final steering position control command Y by subtracting a value resulting from multiplying the steering position control command y2 by "the compensation gain x" from a value resulting from multiplying the steering angle position signal y1 by "1–the compensation gain x."

In the apparatus, the final steering position control command Y may be transferred to a Road Wheel Actuator (RWA) through the steering force actuator (SFA).

In the apparatus, in a case where the driver's involvement is continuously maintained for a predetermined time or longer, the processor may stop automatic steering position control by the designated external module and performs the driver-initiated steering control.

In another embodiment, a method of controlling a steer-by-wire steering system may include: generating, by a processor, a steering angle position signal y1 based on a steering angle position from a steering angle sensor; receiving, by a steering position control command receiver, a steering position control command y2 from a designated external module; computing, by the processor, a compensation gain x corresponding to column torque or motor electric current of a steering force actuator (SFA) when a driver's involvement occurs; and computing, by the processor, a final steering position control command Y by reflecting the compensation gain x to the steering angle position signal y1 and the steering position control command y2, and outputting the final steering position control command Y to the steering force actuator (SFA).

In the method, the designated external module may include a parking assist (PA) system.

In the method, the compensation gain x may be a compensation gain x for compensating steering position control initiated by the driver's involvement in steering during automatic steering by the designated external module.

In the method, the computing of the compensation gain x, the processor may compute the compensation gain x corresponding to the column torque or the motor electric current using a predetermined equation or look-up table.

In the method, in order to compute the final steering position control command Y, the processor may compute the final steering position control command Y by subtracting a value resulting from multiplying the steering position control command y2 by "the compensation gain x" from a value resulting from multiplying the steering angle position signal y1 by "1–the compensation gain x."

In the method, the final steering position control command Y may be transferred to a Road Wheel Actuator (RWA) through the steering force actuator (SFA).

In the method, in a case where the driver's involvement is continuously maintained for a predetermined time or longer, the processor may stop automatic steering position control by the designated external module and performs the driver-initiated steering control.

According to an aspect of the present disclosure, the apparatus and the method are capable of detecting a driver's involvement during steering angle position control for automatic parking and compensating the steering angle position control in a steer-by-wire (SBW) steering system in which a steering force actuator (SFA) and a Road Wheel Actuator (RWA) are not mechanically connected to each other. With the apparatus and the method, the driver's perceiving a feeling of being impacted and an occurrence of a collision from occurring can be prevented.

DESCRIPTION OF THE ILLUSTRATED EMBODIMENTS

Figure 1:
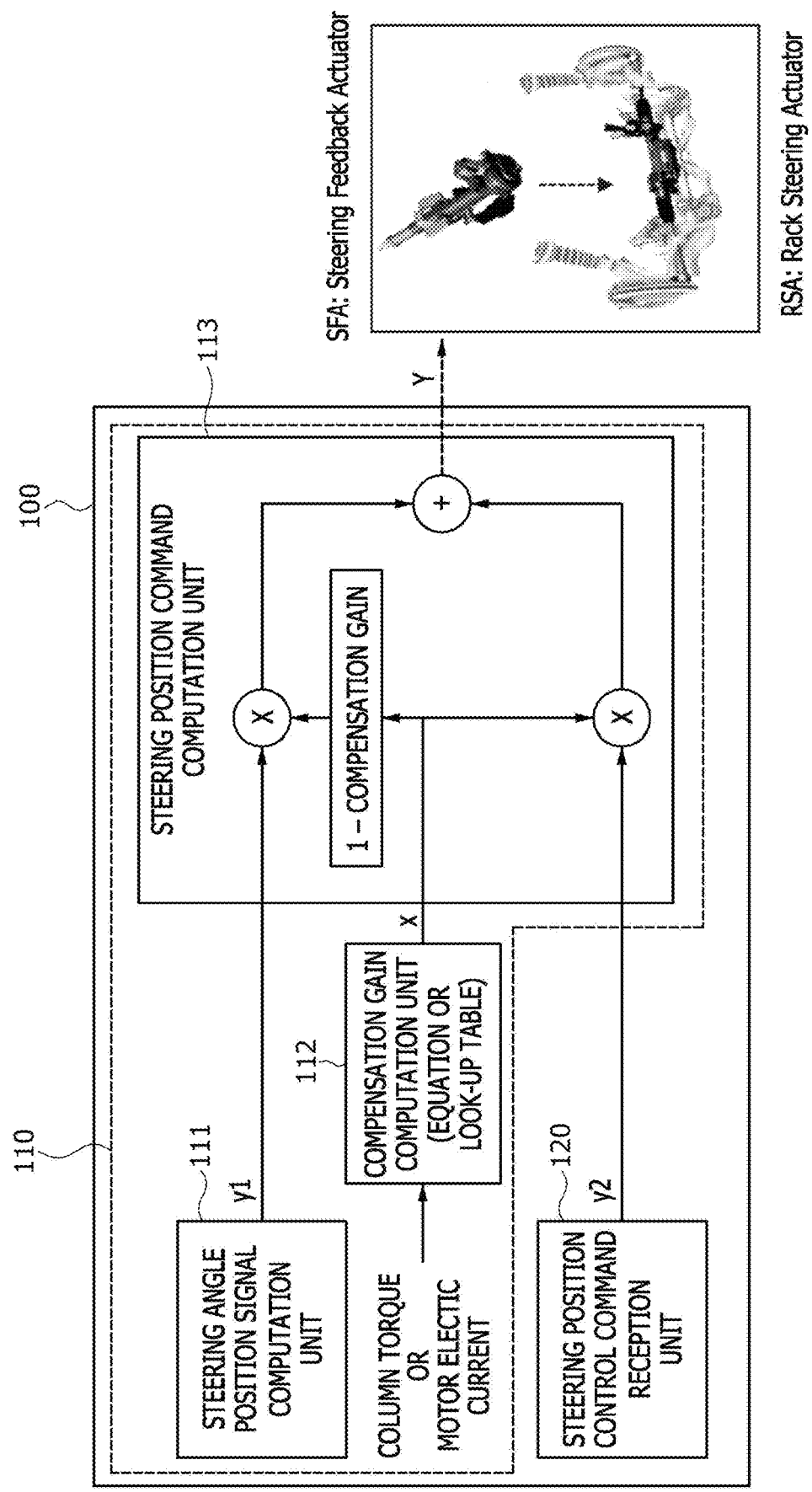
FIG. 1 is a diagram illustrating a schematic configuration of an apparatus for controlling a steer-by-wire steering system according to a first embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

An apparatus for and a method of controlling a steer-by-wire steering system according to first and second embodiments, respectively, of the present disclosure will be described below with reference to the accompanying drawings.

For clarity and convenience in description, the thicknesses of lines and the sizes of constituent elements may be exaggeratedly illustrated in the drawings. In addition, a term defined by considering a function of a constituent element according to the present disclosure to which the term is assigned will be used below and may vary according to the user's or manager's intention or to practices in the art. Therefore, the term should be defined in context in light of the present specification.

Figure 3:
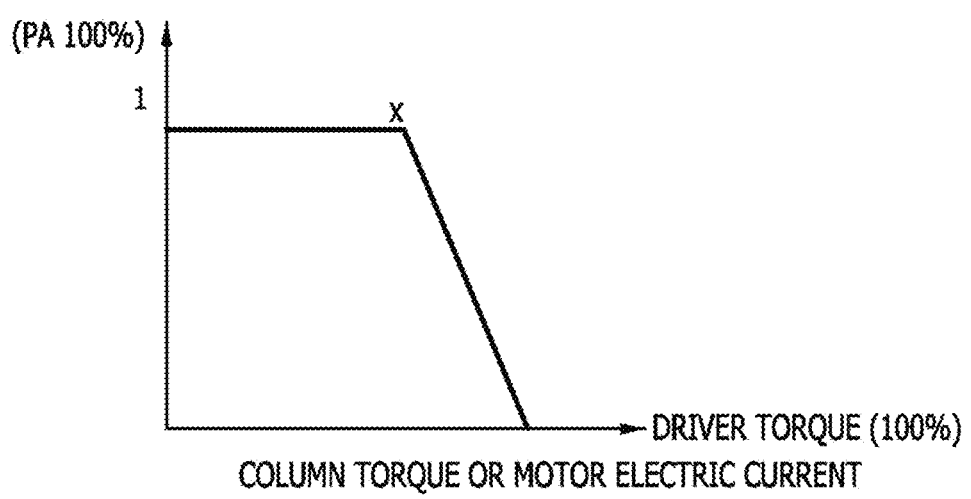
FIG. 3 is a flowchart illustrating a method of controlling a steering position that varies with a compensation gain x in FIG. 1.

FIG. 1 is a diagram illustrating a schematic configuration of the apparatus for controlling a steer-by-wire steering system according to the first embodiment of the present disclosure. FIG. 3 is a flowchart illustrating a method of controlling a steering position that varies with a compensation gain x in FIG. 1.

As illustrated in FIG. 1, an apparatus 100 for controlling a steer-by-wire steering system according to the first embodiment includes a steering angle sensor (not illustrated), a steering position control command receiver (reception unit) 120, and a processor 110. The processor 110 includes a steering angle position signal computation unit 111, a compensation gain computation unit 112, and a steering position command computation unit 113.

The steering angle position signal computation unit 111 computes a current steering angle position using a steering angle sensor (not illustrated) included in a steering force actuator (SFA) and thus outputs a steering angle position signal y1.

The steering position control command receiver 120 receives a steering position control command y2 from a designated external module (for example, a parking assist (PA) system).

The compensation gain computation unit 112 computes a compensation gain x corresponding to column torque or motor electric current of the steering force actuator (SFA). The compensation gain x here is a compensation gain x for compensating steering position control (that is, steering angle position control) by a driver's involvement (that is, a driver's involvement in steering) during automatic steering by the designated external module (for example, the parking assist (PA) system).

The compensation gain computation unit 112 computes the compensation gain x corresponding to the column torque or the motor electric current using a predetermined equation or look-up table.

The steering position command computation unit 113 computes a final steering position control command Y by reflecting the compensation gain x to the steering angle position signal y1 and the steering position control command y2 and outputs the final steering position control command Y to the steering force actuator (SFA).

More specifically, the steering position command computation unit 113 computes the final steering position control command Y by subtracting a value (that is, y2*x) resulting from multiplying the steering position control command y2 by "the compensation gain x" from a value (that is, y1*(1−x)) resulting from multiplying the steering angle position signal y1 by "1−the compensation gain x."

Therefore, in a case where the compensation gain x is 1, the steering angle position signal y1 is multiplied by 0. Thus, a state where the driver's involvement does not occur is attained. Therefore, the designated external module (for example, the parking assist (PA) system) performs only automatic steering position control on a 100% basis. In a case where the compensation gain x is 0, the steering angle position signal y2 is multiplied by 0. Thus, the automatic steering position control by the designated external module (for example, the parking assist (PA) system) is interrupted, and only driver-initiated steering control is performed on a 100% basis (refer to FIG. 3). In addition, in a case where the compensation gain x is 0<x<1, steering position control for compensating steering position is performed (refer to an inclination section in FIG. 3).

The final steering position control command Y that is output from the steering position command computation unit 113 is transferred to a Road Wheel Actuator (RWA) through the steering force actuator (SFA) and then serves to controls a steering position.

At this time, in a case where the driver's involvement is continuously maintained for a predetermined time or longer, the processor 110 of the apparatus 100 for controlling a steer-by-wire steering system according to the first embodiment stops the automatic steering position control by the designated external module (for example, the parking assist (PA) system) and performs the driver-initiated steering control.

Figure 2:
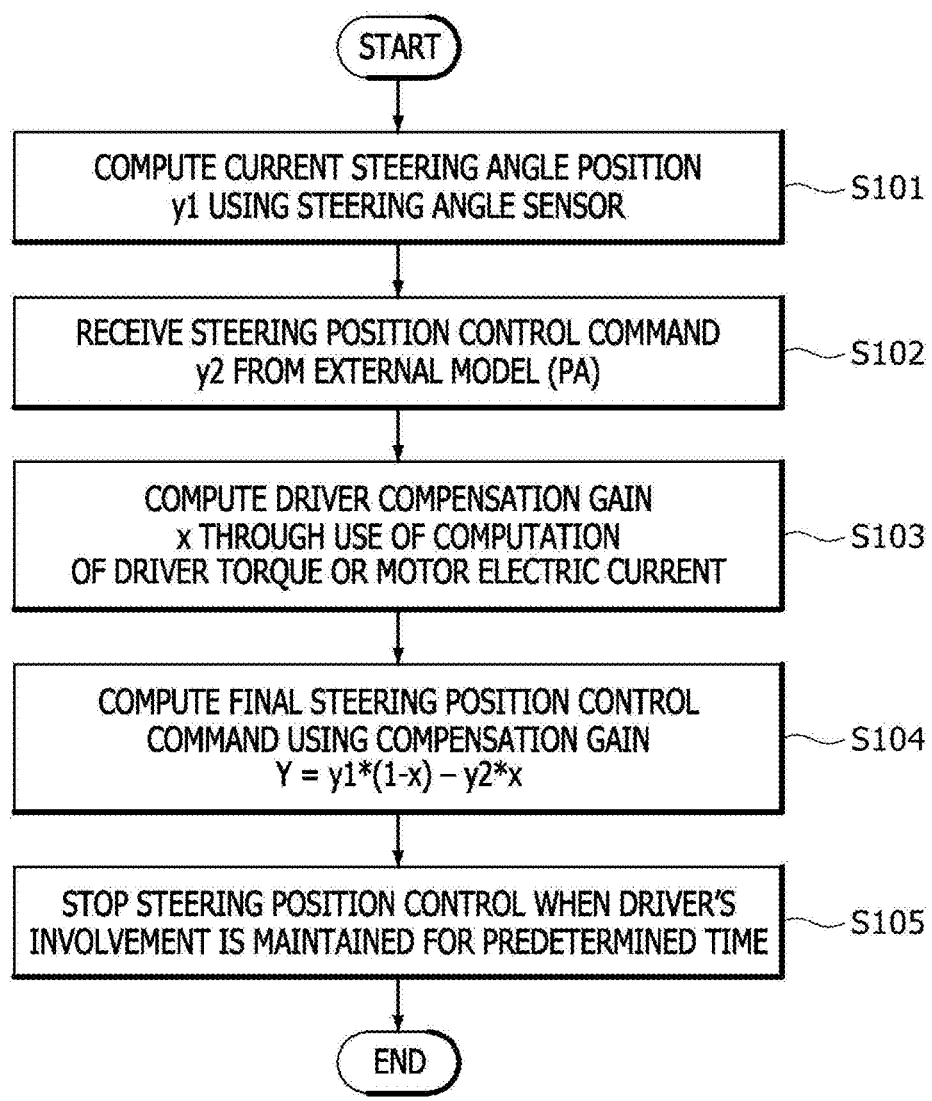
FIG. 2 is a flowchart illustrating a method of controlling a steer-by-wire steering system according to a second embodiment of the present disclosure.

FIG. 2 is a flowchart illustrating the method of controlling a steer-by-wire steering system according to the second embodiment of the present disclosure.

With reference to FIG. 2, in the method of controlling a steer-by-wire steering system according to the second embodiment, the steering angle position signal computation unit 111 computes the current steering angle position using the steering angle sensor (not illustrated) included in the steering force actuator (SFA) and thus outputs the steering angle position signal y1 (S101).

In addition, the steering position control command receiver 120 receives the steering position control command y2 from the designated external module (for example, the parking assist (PA) system) (S102).

In addition, the compensation gain computation unit 112 computes the compensation gain x corresponding to the column torque or the motor electric current of the steering force actuator (SFA) (S103).

The compensation gain x here is the compensation gain x for compensating the steering position control (that is, the steering angle position control) by the driver's involvement (that is, the driver's involvement in steering) during the automatic steering by the designated external module (for example, the parking assist (PA) system).

That is, the compensation gain computation unit 112 computes the compensation gain x corresponding to the column torque or the motor electric current using the predetermined equation or look-up table.

In addition, the steering position command computation unit 113 computes the final steering position control command Y by reflecting the compensation gain x to the steering angle position signal y1 and the steering position control command y2 and outputs the final steering position control command Y to the steering force actuator (SFA) (S104).

More specifically, the steering position command computation unit 113 computes the final steering position control command Y by subtracting a value (that is, y2*x) resulting from multiplying the steering position control command y2 by "the compensation gain x" from a value (that is, y1*(1−x)) resulting from multiplying the steering angle position signal y1 by "1−the compensation gain x."

For example, in the case where the compensation gain x is 1, the steering angle position signal y1 is multiplied by 0. Thus, the state where the driver's involvement does not occur is attained, and therefore the designated external module (for example, the parking assist (PA) system) performs only the automatic steering position control on a 100% basis. In the case where the compensation gain x is 0, the steering angle position signal y2 is multiplied by 0. Thus, the automatic steering position control by the designated external module (for example, the parking assist (PA) system) is interrupted, and driver-initiated steering control is performed on a 100% basis (refer to FIG. 3).

In addition, in the case where the compensation gain x is 0<x<1, the steering position control for compensating the steering position is performed (refer to the inclination section in FIG. 3). That is, in the case where the compensation gain x is 0<x<1, it should be noted that instead of the automatic steering position control or the driver's initiated steering control being performed, the steering control is performed with a value for compensation.

The final steering position control command Y that is output from the steering position command computation unit 113 is transferred to the road wheel actuator (RWA) through the steering force actuator(SFA) and then serves to control the steering position.

At this time, in the case where the driver's involvement is continuously maintained for the predetermined time or longer, the processor 110 for controlling a steer-by-wire steering system according to the first embodiment stops the automatic steering position control by the designated external module (for example, the parking assist (PA) system) and performs the driver's initiated steering control (S105).

As described above, according to the second embodiment, in the steer-by-wire (SBW) steering system in which the steering force actuator SFA is not mechanically connected, the driver's involvement is detected during steering angle position control for automatic parking, and then the steering angle position control is compensated. Thus, the advantageous effect of preventing the driver from perceiving a feeling of being impacted and preventing a vehicle accident from occurring can be achieved.

The embodiments of the present disclosure are described only in an exemplary manner, with reference to the drawings. It will be apparent to a person of ordinary skill in the art to which the present disclosure pertains that various other modifications and equivalents are possible from this description. Thus, the true technical scope of the disclosure should be defined by the following claims. A way of realizing the technical idea of the present disclosure that is described in the present specification may be by taking the form of, for example, a method, a process, an apparatus, a software program, a data stream, or a signal. The feature, although described only in the context of realization in a single form (for example, described as realized in the form of only a method) may also be realized in a different form (for example, in the form of an apparatus or a program). The apparatus may be realized in the form of adequate hardware, software, firmware, or the like. The method, for example, may be realized in an apparatus, such as a computer, a microprocessor, or a processor that generally refers to a processing device, such as an integrated circuit or a programmable logic device. The apparatuses also include a computer that facilitates communication of information between end users, a cellular phone, a portable/personal information terminal (a personal digital assistant ("PDA"), and other communication devices.

What is claimed is:

1. An apparatus for controlling a steer-by-wire steering system, the apparatus comprising:
a steering angle sensor configured to detect a steering angle position;
a steering position control command receiver configured to receive a steering position control command y2 from a designated external module; and
a processor configured to generate a steering angle position signal y1 based on the steering angle position from the steering angle sensor, compute a compensation gain x corresponding to column torque or motor electric current of a steering force actuator (SFA) when a driver's involvement occurs, compute a final steering position control command Y by reflecting the compensation gain x to the steering angle position signal y1 and the steering position control command y2, and output the final steering position control command Y to the steering force actuator (SFA).

2. The apparatus of claim 1, wherein the designated external module includes a parking assist (PA) system.

3. The apparatus of claim 1, wherein the compensation gain x is a compensation gain x for compensating steering position control initiated by the driver's involvement in steering during automatic steering by the designated external module.

4. The apparatus of claim 1, wherein the processor computes the compensation gain x corresponding to the column torque or the motor electric current using a predetermined equation or look-up table.

5. The apparatus of claim 1, wherein the processor computes the final steering position control command Y by subtracting a value resulting from multiplying the steering position control command y2 by "the compensation gain x" from a value resulting from multiplying the steering angle position signal y1 by "1−the compensation gain x".

6. The apparatus of claim 1, wherein the final steering position control command Y is transferred to a road wheel actuator (RWA) through the steering force actuator (SFA).

7. The apparatus of claim 1, wherein in a case where the driver's involvement is continuously maintained for a predetermined time or longer, the processor stops automatic steering position control by the designated external module and performs the driver-initiated steering control.

8. A method of controlling a steer-by-wire steering system, the method comprising:
generating, by a processor, a steering angle position signal y1 based on a steering angle position from a steering angle sensor;
receiving, by a steering position control command receiver, a steering position control command y2 from a designated external module;
computing, by the processor, a compensation gain x corresponding to column torque or motor electric current of a steering force actuator (SFA) when a driver's involvement occurs; and
computing, by the processor, a final steering position control command Y by reflecting the compensation gain x to the steering angle position signal y1 and the steering position control command y2, and outputting the final steering position control command Y to the steering force actuator (SFA).

9. The method of claim 8, wherein the designated external module includes a parking assist (PA) system.

10. The method of claim 8, wherein the compensation gain x is a compensation gain x for compensating steering position control initiated by the driver's involvement in steering during automatic steering by the designated external module.

11. The method of claim 8, wherein in the computing of the compensation gain x, the processor computes the compensation gain x corresponding to the column torque or the motor electric current using a predetermined equation or look-up table.

12. The method of claim 8, wherein in order to compute the final steering position control command Y, the processor computes the final steering position control command Y by subtracting a value resulting from multiplying the steering position control command y2 by "the compensation gain x" from a value resulting from multiplying the steering angle position signal y1 by "1−the compensation gain x".

13. The method of claim 8, wherein the final steering position control command Y is transferred to a road wheel actuator (RWA) through the steering force actuator (SFA).

14. The method of claim 8, wherein in a case where the driver's involvement is continuously maintained for a predetermined time or longer, the processor stops automatic steering position control by the designated external module and performs the driver-initiated steering control.

* * * * *